United States Patent
Chen et al.

(10) Patent No.: US 10,552,474 B2
(45) Date of Patent: Feb. 4, 2020

(54) IMAGE RECOGNITION METHOD AND DEVICE THEREOF

(71) Applicant: Industrial Technology Research Institute, Hsinchu (TW)

(72) Inventors: Hsin-Yi Chen, Hsinchu (TW); Chia-Liang Yeh, Miaoli County (TW); Sen-Yih Chou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 119 days.

(21) Appl. No.: 15/851,647

(22) Filed: Dec. 21, 2017

(65) Prior Publication Data

US 2019/0057112 A1    Feb. 21, 2019

Related U.S. Application Data

(60) Provisional application No. 62/546,011, filed on Aug. 16, 2017.

(51) Int. Cl.
| | |
|---|---|
| G06F 16/583 | (2019.01) |
| H04N 5/232 | (2006.01) |
| G06N 3/08 | (2006.01) |
| G06K 9/03 | (2006.01) |
| G06N 3/04 | (2006.01) |
| G06K 9/62 | (2006.01) |
| G06K 9/32 | (2006.01) |

(52) U.S. Cl.
CPC ............. *G06F 16/583* (2019.01); *G06K 9/03* (2013.01); *G06K 9/6256* (2013.01); *G06N 3/0454* (2013.01); *G06N 3/08* (2013.01); *H04N 5/23219* (2013.01); *G06K 9/3233* (2013.01)

(58) Field of Classification Search
CPC ...... G06K 9/03; G06K 9/6256; G06K 9/3233; G06N 3/0454; G06N 3/08; G06F 16/583; H04N 5/23219
See application file for complete search history.

(56) References Cited

U.S. PATENT DOCUMENTS

| 7,286,699 B2 | 10/2007 | Simard et al. |
| 2011/0081053 A1 | 4/2011 | Zheng et al. |

(Continued)

FOREIGN PATENT DOCUMENTS

| CN | 103503029 | 1/2014 |
| TW | 200639747 | 11/2006 |
| TW | 201602920 | 1/2016 |

OTHER PUBLICATIONS

"Office Action of Taiwan Counterpart Application", dated Jan. 31, 2019, p. 1-p. 5.

(Continued)

*Primary Examiner* — Leon Flores
(74) *Attorney, Agent, or Firm* — JCIPRNET

(57) ABSTRACT

An image recognition method adapted to recognize a target image is provided. The method includes: providing the target image; training a learning database based on a plurality of feature blocks of the target image; randomly obtaining a plurality of incomplete feature blocks of the target image; adding the plurality of incomplete feature blocks into the learning database to form an enhancement learning database; and recognizing the target image based on the enhancement learning database. In addition, an image recognition device is also provided.

12 Claims, 7 Drawing Sheets

(56) References Cited

U.S. PATENT DOCUMENTS

2015/0117773 A1* 4/2015 Kamiya ............ G06K 9/00362
                                                            382/165
2017/0140247 A1* 5/2017 Yoo .................... G06K 9/00067
2017/0286809 A1* 10/2017 Pankanti .................. G06K 9/66

OTHER PUBLICATIONS

Benjamin Chandler et al.,"Mitigation of Effects of Occlusion on Object Recognition with Deep Neural Networks through Low-Level Image Completion", Computational Intelligence and Neuroscience, vol. 2016, Jun. 2016,pp. 1-15.
Navin Rajpal et al.,"Recognition of partially occluded objects using neural network based indexing",Pattern Recognition ,vol. 32, Issue 10, Oct. 1999, pp. 1737-1749.

* cited by examiner

IMAGE RECOGNITION METHOD AND DEVICE THEREOF

CROSS-REFERENCE TO RELATED APPLICATION

This application claims the priority benefits of U.S. provisional application Ser. No. 62/546,011, filed on Aug. 16, 2017. The entirety of the above-mentioned patent application is hereby incorporated by reference herein and made a part of this specification.

TECHNICAL FIELD

The disclosure relates to an image recognition method and an image recognition device.

BACKGROUND

As the digital image processing techniques continuously advance, more and more products relating to image recognition hit the market. Examples of such products include digital cameras capable of human face recognition, dash-cams capable of recognizing pedestrians, and surveillance monitors capable of calculating pedestrian flow. Efforts have been made in the academic as well as industrial circles for computers to recognize digital images like human beings do.

With the convolution neural network (CNN), preferable results have been rendered in digital image recognition. The convolution neural network not only facilitates the performance of whole-image classification, but also reinforce the capability of local image recognition. Nevertheless, image recognition adopting technologies such as the convolution neural network may be affected by a shielding object covering the target, and the recognition rate is thus affected. Hence, image recognition technologies still require attention of the researchers.

SUMMARY

One or some exemplary embodiments of the disclosure provide an image recognition method and an image recognition device capable of training again and thus enhancing a learning database and facilitating the accuracy of recognition of a target image.

An embodiment of the disclosure provides an image recognition method adapted to recognize a target image. The method includes: providing the target image; training a learning database based on a plurality of feature blocks of the target image; randomly obtaining a plurality of incomplete feature blocks of the target image; adding the plurality of incomplete feature blocks into the learning database to form an enhancement learning database; and recognizing the target image based on the enhancement learning database.

One or some embodiments of the disclosure provide an image recognition device adapted to recognize a target image. The image recognition device includes an image capturing module, a storage module, and a processing module. The image capturing module is adapted to capture the target image. The storage module is adapted to store the target image. The processing module is electrically connected to the image capturing module and the storage module, and provides a plurality of feature blocks of the target image to the storage module to train a learning database. The processing module is adapted to randomly obtain a plurality of incomplete feature blocks of the target image, add the incomplete feature blocks to the learning database to form an enhancement learning database, and thereby recognizes the target image based on the enhancement learning database.

Based on the above, in the image recognition method and the image recognition device according to the embodiments of the disclosure, the processing module trains the learning database based on the feature blocks of the target image, randomly obtains the incomplete feature blocks and adds the incomplete feature blocks to the learning database to update the learning database and form the enhancement learning database, and recognizes the target image based on the enhancement learning database. Accordingly, the learning database is trained again and enhanced, and the accuracy of recognizing the target image is facilitated.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
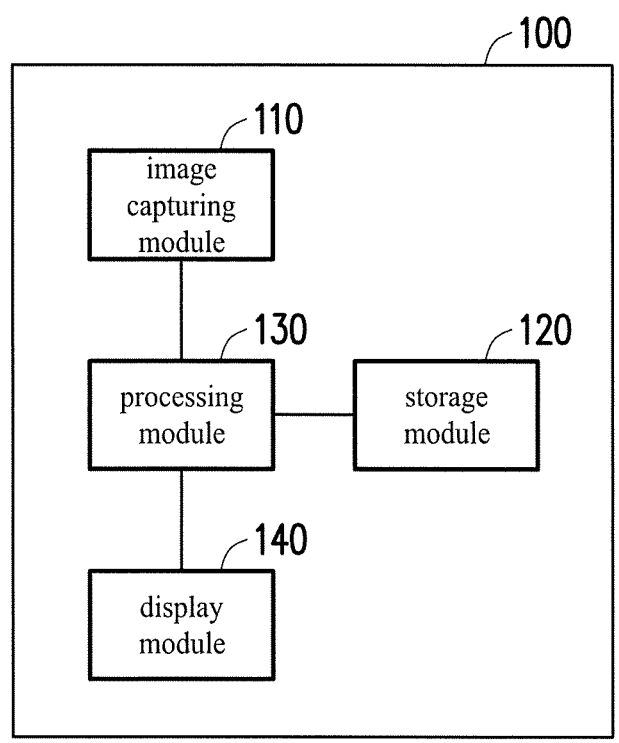
FIG. 1 is a block diagram illustrating an image recognition device according to an embodiment of the disclosure.
Figure 2:
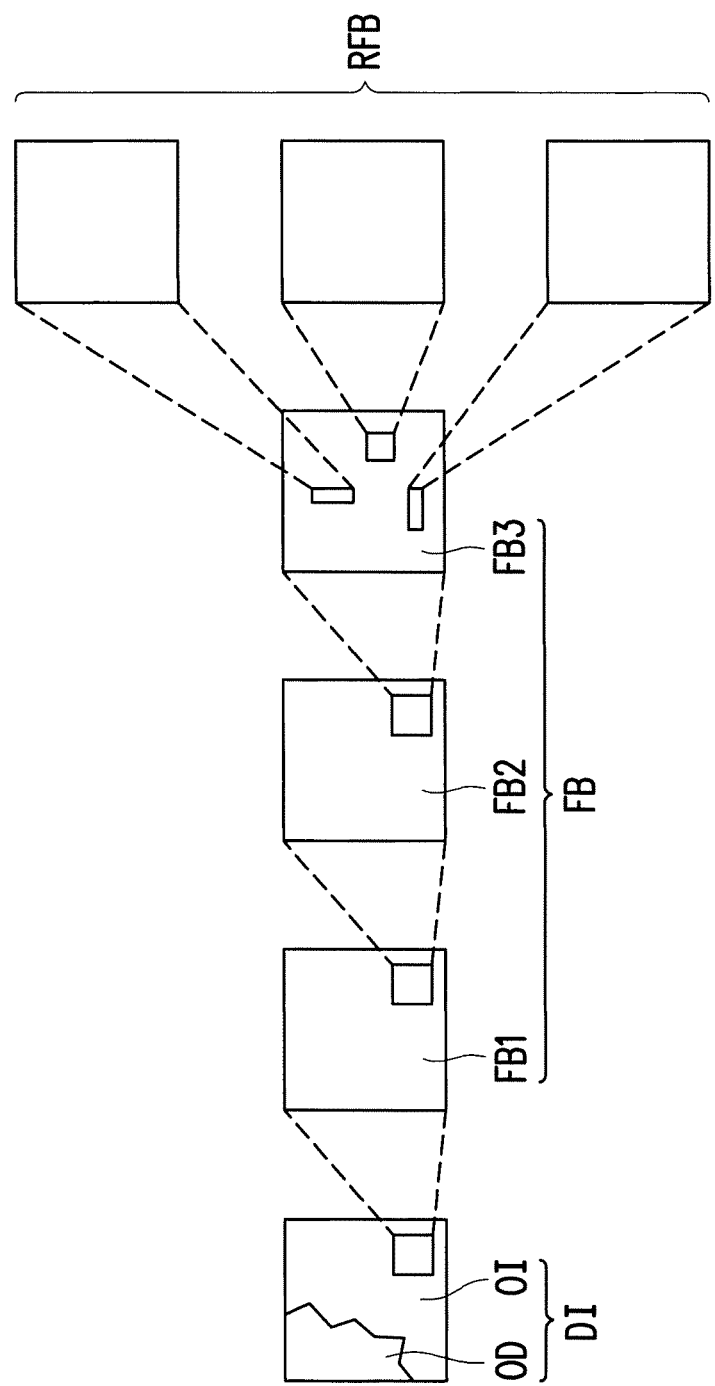
FIG. 2 is a schematic view illustrating that the image recognition device of FIG. 1 captures feature blocks of a target image.

FIG. 1 is a block diagram illustrating an image recognition device according to an embodiment of the disclosure. FIG. 2 is a schematic view illustrating that the image recognition device of FIG. 1 captures feature blocks of a target image. Referring to FIGS. 1 and 2, in the embodiment, a recognition device 100 is adapted to recognize a target image DI. A portion of the target image DI is shielded. In addition, the target image DI includes a feature part OI and a shielding part OD. For example, the target image DI may be a human face shielded by leaves, the shielding part OD is the leaves, and the feature part OI is a portion of the human face not shielded by the leaves. The recognition device 100 includes an image capturing module 110, a storage module 120, and a processing module 130. During recognition of the target image DI, the image capturing module 110 is adapted to capture the target image DI. The image capturing module 110 is a module including a device capable of capturing a two-dimensional image or a three-dimensional image (e.g., an electronic device such as a digital camera, a video camera, a cell phone, a tablet computer, a notebook computer, or a desktop computer). A capturing device may include a charge coupled device (CCD) lens, a complementary metal oxide semiconductor transistor (CMOS) lens, a depth camera, a stereo camera, or the like, for example.

The storage module 120 is adapted to store the target image DI. The storage module 120 may include any type of fixed or removable random access memory (RAM), read-only memory (ROM), flash memory, similar components, or a combination thereof, for example.

The processing module 130 is electrically connected to the image capturing module 110 and the storage module 120, and provides a plurality of feature blocks FB of the target image DI to the storage module 120 to train a learning database. The processing module 130 may be a central processing unit (CPU), other programmable general-purpose or specific-purpose microprocessor, digital signal processor (DSP), programmable controller, application specific integrated circuit (ASIC), other similar components, or a combination thereof.

In the embodiment, the processing module 130 may randomly obtain a plurality of incomplete feature blocks RFB in the target image DI. The incomplete feature blocks RFB may be considered as incomplete for having breakage, defects, or the like. The processing module 130 may add the incomplete feature blocks RFB to the learning database to form an enhancement learning database, so as to recognize the target image DI based on the enhancement learning database. Specifically, in the embodiment, the learning database may adopt a deep learning model to recognize the target image DI, and the target image DI may be a two-dimensional image or a three-dimensional image, for example. In other words, a type of an image to be recognized depends on a type of the image capturing module 110, and the deep learning model may be implemented by adopting a convolution neural network (CNN) using convolution operation, for example. Nevertheless, the disclosure is not limited thereto. In the embodiment, the convolution operation may be carried out based on steps of any known convolution operation. The disclosure does not intend to impose a limitation on this regard. Sufficient teaching, suggestion, and implementation illustration about detailed steps and implementation of the convolution operation can be obtained in the known art. Therefore, details in this regard will not be repeated in the following.

In the embodiment, the recognition device 100 further includes a display module 140 adapted to display the target image DI or a complete image. Compared with the target image DI, the complete image is not shielded. Specifically, the processing module 130 is adapted to obtain the complete image based on a recognition result after recognition of the target image DI. Hence, the target image DI recognized by the processing module 130 or the complete image may be displayed by the display module 140. The display module 140 may be a display device with a display function, such as a display device including a liquid crystal display (LCD), a light emitting diode (LED) display, a field emission display (FED), or the like.

Figure 3:
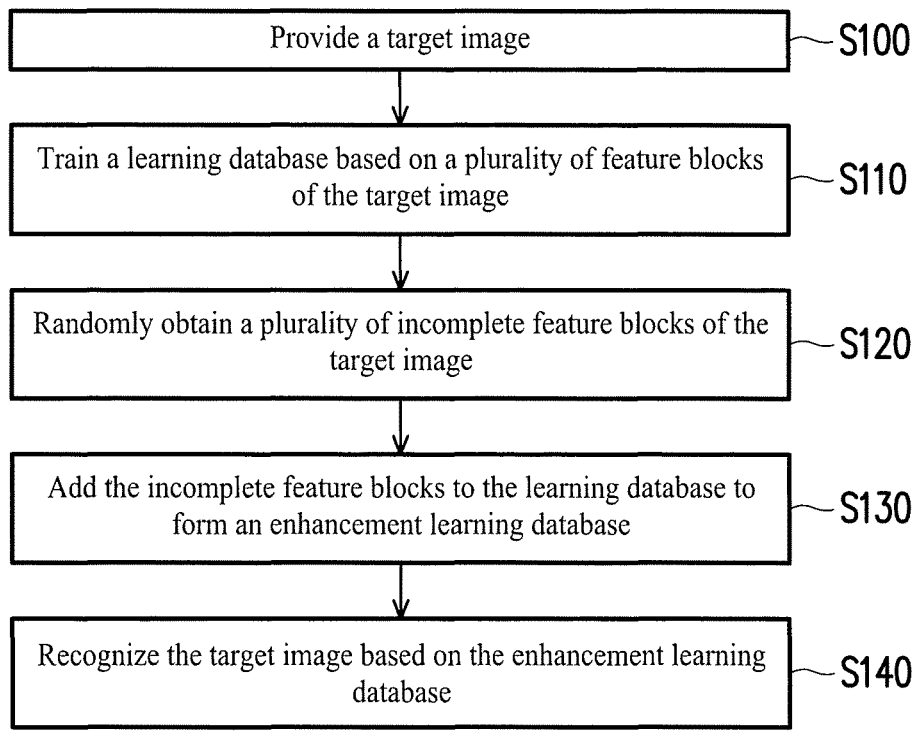
FIG. 3 is a flowchart illustrating an image recognition method according to an embodiment of the disclosure.
Figure 4:
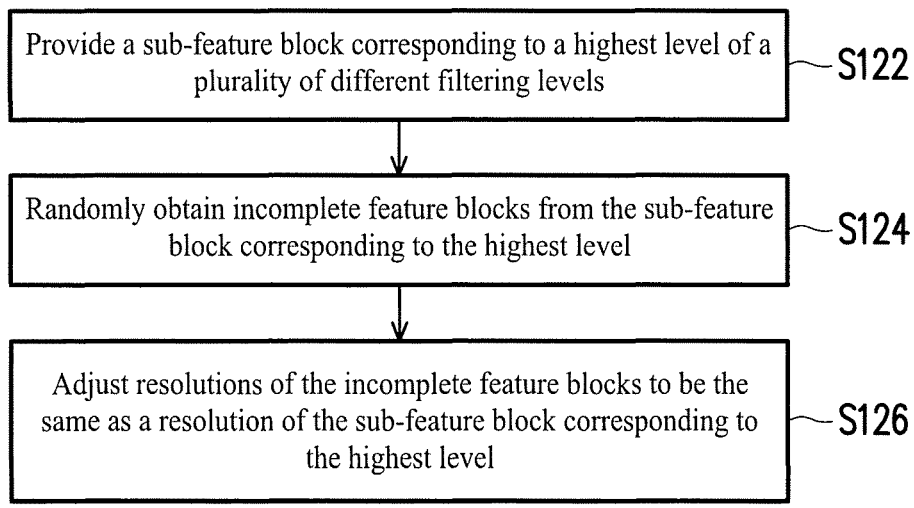
FIG. 4 is a flowchart illustrating details of randomly obtaining incomplete feature blocks at Step S120 of FIG. 3.

FIG. 3 is a flowchart illustrating an image recognition method according to an embodiment of the disclosure. FIG. 4 is a flowchart illustrating details of randomly obtaining incomplete feature blocks at Step S120 of FIG. 3. Referring to FIGS. 1 to 4, the image recognition method of the embodiment may be adapted for the image recognition device of FIG. 1. Nevertheless, the image recognition method of the embodiment is not required to be carried out by the image recognition device of FIG. 1. At Step S100, the target image DI is provided. At Step S110, the learning database is trained based on the feature blocks FB of the target image DI. In the embodiment, training the learning database based on the feature blocks FB of the target image DI includes the following. Firstly, a plurality of different filtering levels is provided. Then, based on the different filtering levels, the feature blocks FB are obtained from the target image DI. In addition, the feature blocks FB include a plurality of sub-feature blocks FB1, FB2, and FB3 corresponding to the different filtering levels. Then, the learning database is trained based on the sub-feature blocks FB1, FB2, and FB3.

Specifically, in the embodiment, the processing module 130 includes the different filtering levels. The filtering levels are filters in the convolution neural network, for example. Based on the different filtering levels, the processing module 130 obtains the feature blocks FB from the target image DI. The feature blocks FB include a plurality of sub-feature blocks corresponding to the different filtering levels, such as the sub-feature blocks FB1, FB2, and FB3 shown in FIG. 2. Specifically, in an example with three filtering levels of the embodiment, the processing module 130 includes a low filtering level, an intermediate filtering level, and a high filtering level. The processing module 130 obtains the low-level sub-feature block FB1 from the target image DI based on the low-level filtering level, then obtains the intermediate-level sub-feature block FB2 from the low-level sub-feature block FB1 based on the intermediate filtering level, and then obtains the high-level sub-feature block FB3 from the intermediate-level sub-feature block FB2 based on the high filtering level, thereby training the learning database. In other words, at the low filtering level, a filter with a higher resolution, for example, is adopted to obtain the low-level sub-feature block FB1 with a higher resolution from the target image DI. At the intermediate filtering level, a filter with a resolution lower than the resolution at the low filtering level, for example, is adopted to obtain the intermediate-level sub-feature block FB2 with a resolution lower than the resolution of the low-level sub-feature block FB1 from the target image DI. At the high filtering level, a filter with a lowest resolution lower than the resolution at the intermediate filtering level, for example, is adopted to obtain the high-level sub-feature block FB3 with a resolution lower than the resolution of the intermediate-level sub-feature block FB2 from the target image DI. In the embodiment, differences among the different filtering levels may be adjusted based on needs. The disclosure does not intend to impose a limitation on this regard. In addition, in other embodiments, the number of filtering levels may adjusted based on needs. The disclosure does not intend to impose a limitation on this regard.

Then, at Step S120, the incomplete feature blocks RFB of the target image DI are randomly obtained. In the embodiment, randomly obtaining the incomplete feature blocks RFB of the target image DI includes the following. At Step S122, the sub-feature block corresponding to the highest level of the different filtering levels, i.e., the high-level sub-feature block FB3 shown in FIG. 2, is provided. Then, at Step S124, the incomplete feature blocks RFB are randomly obtained from the high-level sub-feature block FB3 corresponding to the highest level. The number of the incomplete feature blocks RFB is greater than or equal to 0. In addition, the incomplete feature blocks RFB are different from each other in the corresponding high-level sub-feature block FB3. Specifically, the incomplete feature blocks RFB are randomly obtained by the processing module 130 from the sub-feature block corresponding to the highest level of the different filtering levels (i.e., the high-level sub-feature block FB3). In addition, the incomplete feature blocks RFB are randomly obtained in each recognition. In other words, the incomplete feature blocks RFB are randomly obtained from the unshielded part (i.e., the feature part OD of the target image DI, and resolutions and features of the respective incomplete feature blocks RFB are different. Then, at Step S126, the resolutions of the incomplete feature blocks RFB are adjusted to correspond to the resolution of the high-level sub-feature block FB3. In other words, the resolutions of the incomplete feature blocks RFB after the adjustment are the same as the resolution of the high-level sub-feature block FB3 obtained at the highest filtering level. Thus, during recognition, the processing module 130 may consider the high-level sub-feature block FB3 and the incomplete feature blocks RFB as feature blocks of the same level.

Then, at Step S130, the incomplete feature blocks RFB are added to the learning database to form an enhancement learning database. Then, at Step S140, the target image DI is recognized based on the enhancement learning database. In other words, the learning database is updated to form the enhancement learning database including random feature blocks. Thus, the enhancement learning databases adopted to recognize the target image DI in the respective recognitions are different. Accordingly, the accuracy of recognizing the target image DI is facilitated, and the learning database is adjustable to other target images DI having different defective parts.

Figure 5:
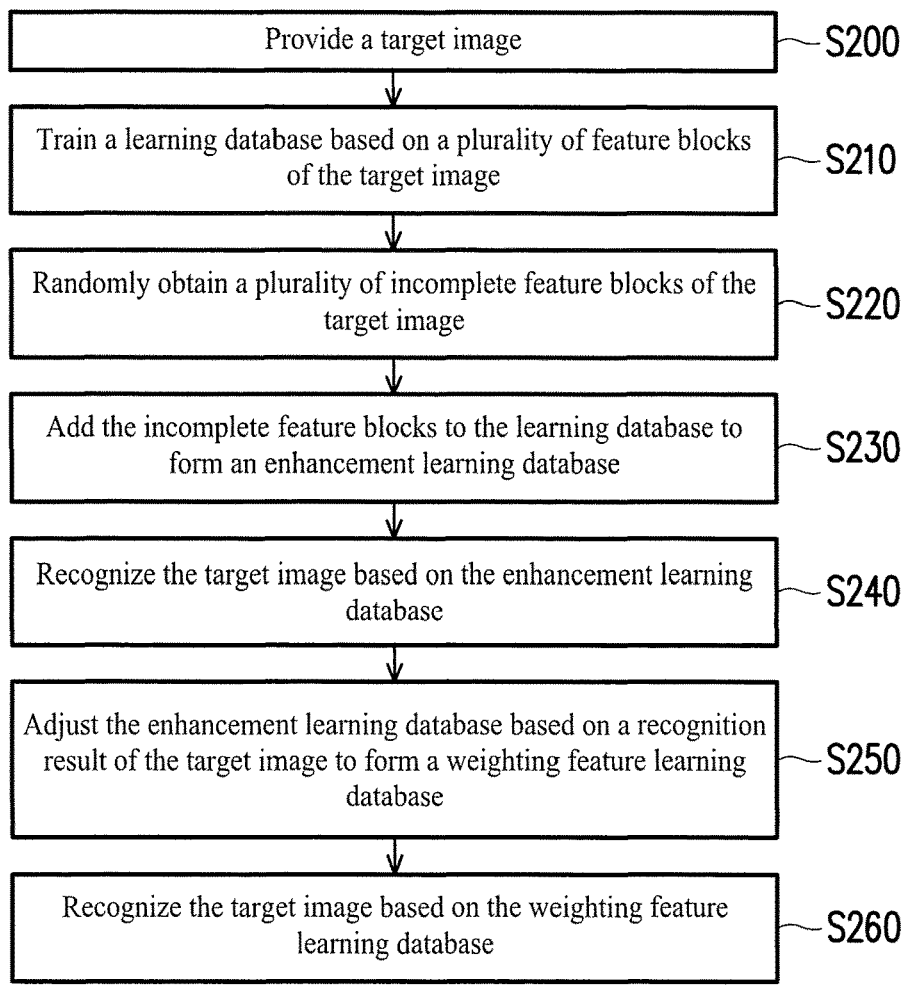
FIG. 5 is a flowchart illustrating an image recognition method according to another embodiment of the disclosure.
Figure 6:
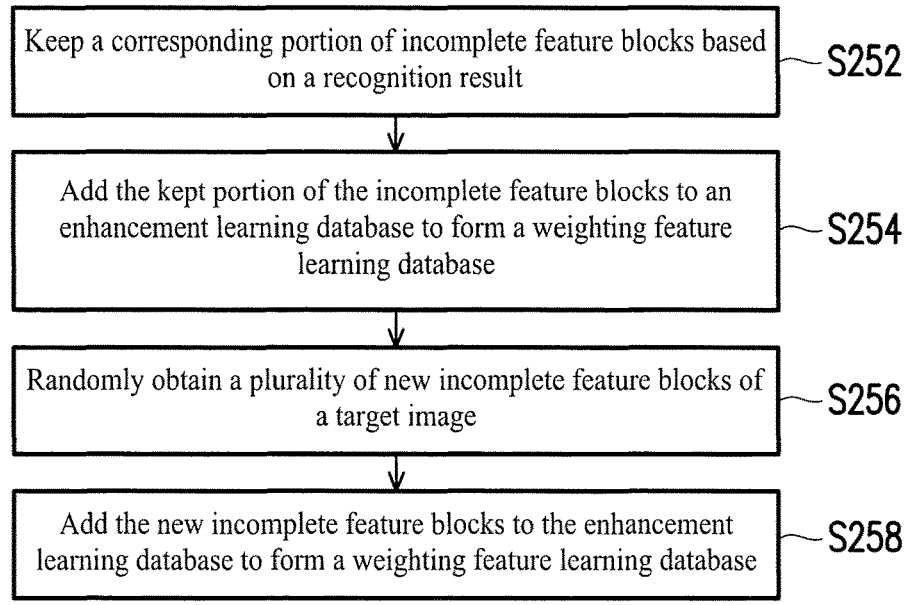
FIG. 6 is a flowchart illustrating adjusting an enhancement learning database based on a recognition result of FIG. 5.

FIG. 5 is a flowchart illustrating an image recognition method according to another embodiment of the disclosure. FIG. 6 is a flowchart illustrating adjusting an enhancement learning database based on a recognition result of FIG. 5. Referring to FIGS. 1, 2, 5, and 6, the image recognition method of the embodiment may be adapted for the image recognition device of FIG. 1. However, the disclosure is not limited thereto. The image recognition method of FIG. 5 is similar to the image recognition method shown in FIG. 3, except for a main difference that the image recognition method of FIG. 5 further includes adjusting the enhancement learning database to form a weighting feature learning database based on a recognition result of the target image DI at Step S250 and recognizing the target image DI based on the weighting feature learning database at Step S260.

Specifically, in the embodiment, adjusting the enhancement learning database to form the weighting feature learning database based on the recognition result of the target image DI at Step S250 further includes keeping a corresponding portion of the incomplete feature blocks RFB in the enhancement learning database based on the recognition result. In other words, after the target image DI is recognized, the processing module 130 may keep a corresponding (i.e., the correct path during recognition) incomplete feature block RFB in the enhancement learning database. Accordingly, the corresponding incomplete feature block RFB may be used again in another recognition, so as to maintain and facilitate the accuracy of recognizing the target image DI.

Then, at Step S254, another portion of the incomplete feature blocks RFB is removed from the enhancement learning database. At Step S256, a plurality of new incomplete feature blocks (not shown) of the target image DI is randomly obtained. In addition, at Step S258, the new incomplete feature blocks RFB are added to the enhancement learning database to form the weighting feature learning database. Specifically, after keeping the corresponding incomplete feature block RFB, the processing module 130 may remove rest of the incomplete feature blocks RFB not used in the previous recognition from the enhancement learning database, randomly obtain a corresponding number of the new incomplete feature blocks from the high-level sub-feature block FB3 of the target image DI, and add the new incomplete feature blocks to the enhancement learning database. In addition, the number of the new incomplete feature blocks corresponds to the number of the another portion of the incomplete feature blocks RFB. Accordingly, the enhancement learning database including the incomplete feature block RFB able to recognize the target image DI is obtained. Accordingly, the accuracy of recognizing the target image DI is maintained and facilitated.

Figure 7:
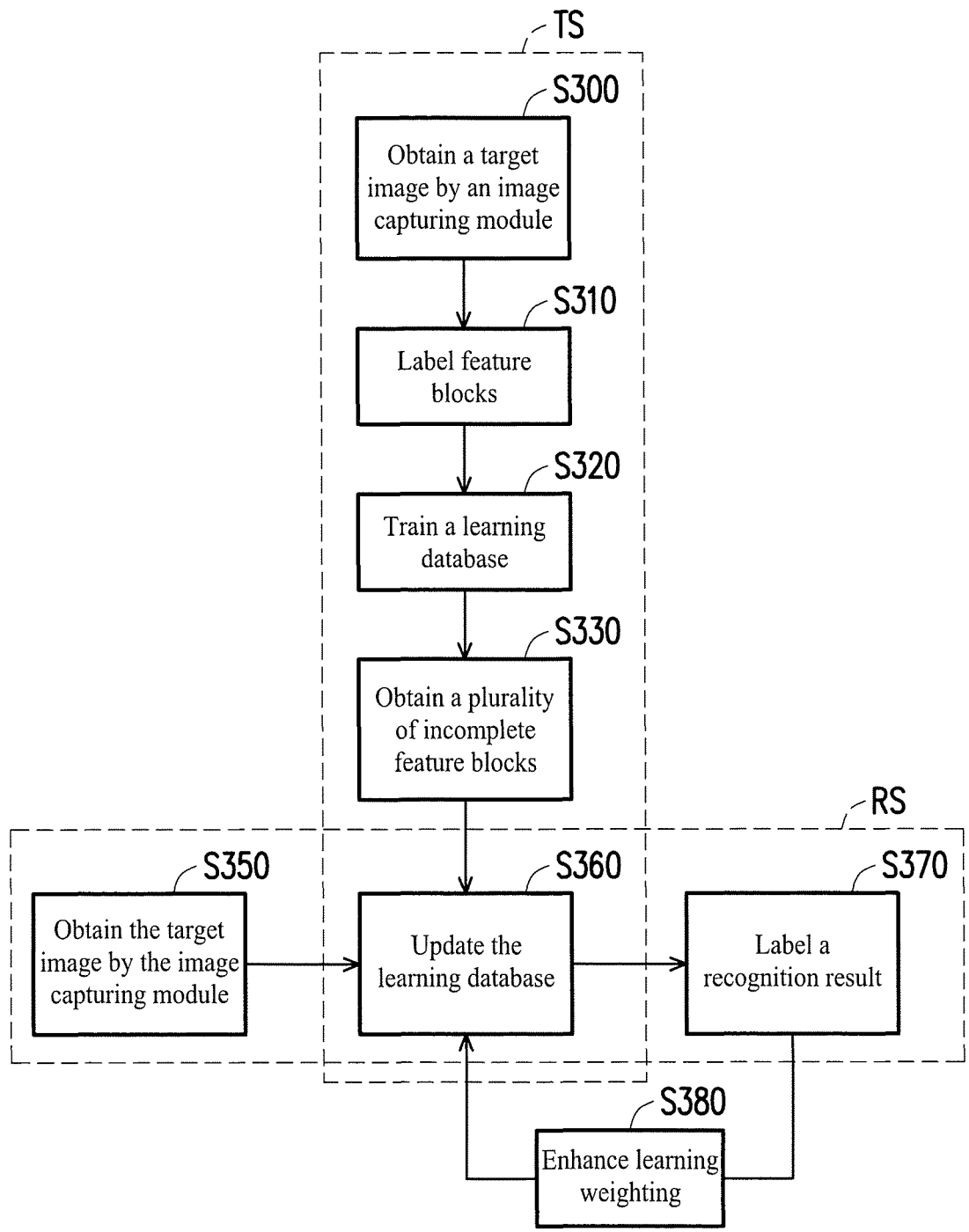
FIG. 7 is a flowchart illustrating an image recognition method according to another embodiment of the disclosure.
Figure 8:
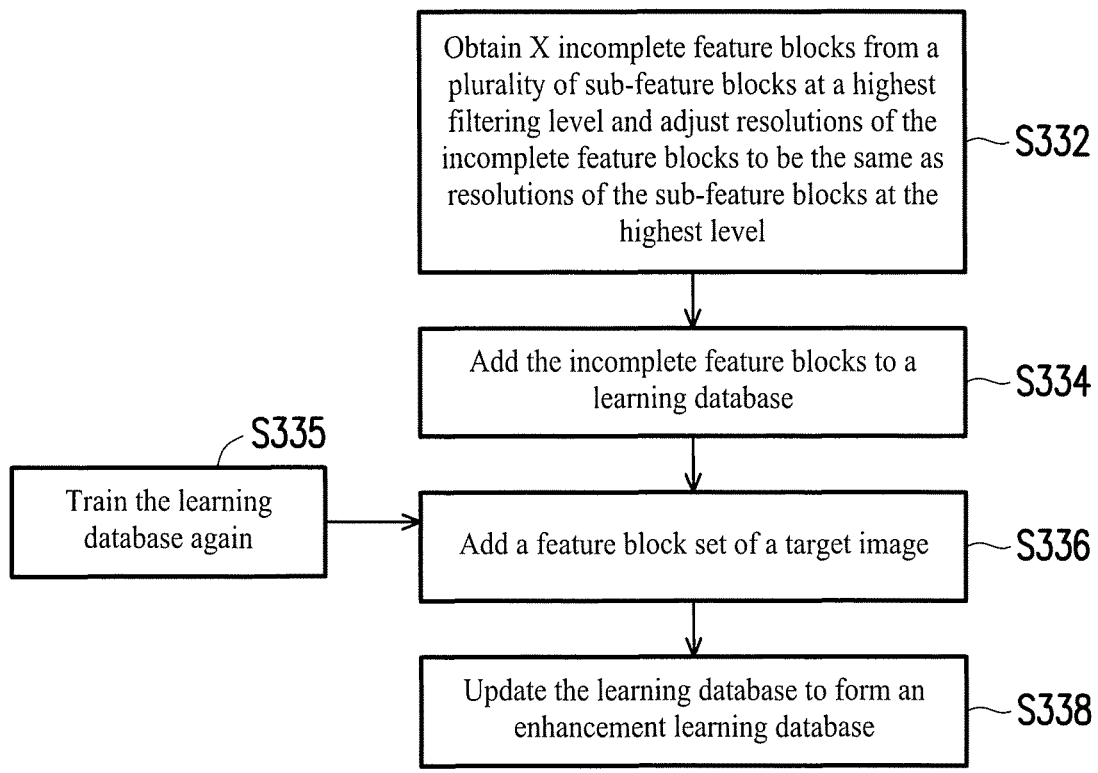
FIG. 8 is a flowchart illustrating details of adding a plurality of new incomplete feature blocks of FIG. 7.
Figure 9:
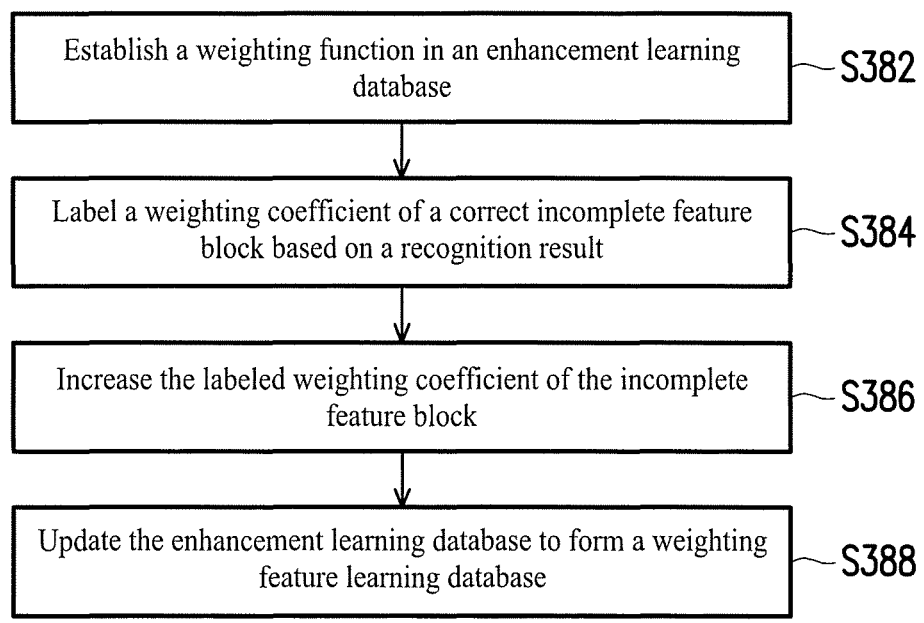
FIG. 9 is a flowchart illustrating details of enhancing learning weighting of FIG. 7.

FIG. 7 is a flowchart illustrating an image recognition method according to another embodiment of the disclosure. FIG. 8 is a flowchart illustrating details of adding a plurality of new incomplete feature blocks of FIG. 7. FIG. 9 is a flowchart illustrating details of enhancing learning weighting of FIG. 7. In the embodiment, the image recognition method may be classified into a training process TS and a recognition process RS. Specifically, in the training process TS, an image capturing module obtains a target image at Step S300, feature blocks are labeled at Step S310, a learning database is trained at Step S320, a plurality of incomplete feature blocks are added at Step S330, and the learning database is updated at Step S360.

Specifically, in Step S330, X incomplete feature blocks are obtained from a plurality of sub-feature blocks at a highest filtering level, and resolutions of the X incomplete feature blocks are adjusted to be the same as resolutions of the sub-feature blocks at the highest filtering level at Step S332, wherein X is greater than or equal to 0; the incomplete feature blocks are added to the learning database at Step S334; a feature block set of the target image is added to the learning database at Step S335; the learning database is trained again at Step S336; and the learning database is updated to form an enhancement learning database at Step S338. Sufficient teaching, suggestion, and implementation illustration about detailed steps and implementation of the addition of the incomplete feature blocks can be obtained in the above paragraphs and the known art. Therefore, details in this regard will not be repeated in the following.

In addition, at the recognition process RS, the image capturing module obtains the target image at Step S350, an updated learning database (i.e., the enhancement learning database of the embodiments) is obtained to recognize the target image at Step S360, a recognition result is labeled at Step S370, and learning weighting is enhanced at Step S380. In addition, Step S360 is carried out again to update the learning database. In other embodiments, the recognition process RS may also be a testing process and may be carried out repetitively to repetitively update the learning database and thereby maintain and facilitate the accuracy of recognizing the target image. However, the invention is not limited thereto.

Specifically, in Step S380, a weighting function is established in the enhancement learning database at Step S382, a weighting coefficient of the correct incomplete feature block is labeled based on the recognition result at Step S384, the labeled weighting coefficient of the incomplete feature block is increased at Step S386, and the enhancement learning database is updated to form the weighting feature learning database at Step S388. Sufficient teaching, suggestion, and implementation illustration about detailed steps and implementation of the learning weighting enhancement can be obtained in the above paragraphs and the known art. Therefore, details in this regard will not be repeated in the following. Accordingly, the accuracy of recognizing the target image is maintained and facilitated by adding the new incomplete feature blocks and enhancing the learning weighting.

In view of the foregoing, in the image recognition method and the image recognition device according to the embodiments of the disclosure, the processing module trains the learning database based on the feature blocks of the target image, randomly obtains the incomplete feature blocks and adds the incomplete feature blocks to the learning database to update the learning database and form the enhancement learning database, and recognizes the target image based on the enhancement learning database. Accordingly, the learning database is trained again and enhanced, and the accuracy of recognizing the target image is facilitated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image recognition method, adapted to recognize a target image, wherein a portion of the target image is shielded, the image recognition method comprising:
   providing the target image;
   training a learning database based on a plurality of feature blocks of the target image;
   randomly obtaining a plurality of incomplete feature blocks of the target image;
   adding the incomplete feature blocks to the learning database to form an enhancement learning database; and
   recognizing the target image based on the enhancement learning database,
   wherein training the learning database based on the feature blocks of the target image comprises:
      providing a plurality of different filtering levels;
      obtaining the feature blocks from the target image based on the different filtering levels, wherein the feature blocks comprise a plurality of sub-feature blocks corresponding to the different filtering levels; and
      training the learning database based on the sub-feature blocks.

2. The image recognition method as claimed in claim 1, wherein randomly obtaining the incomplete feature blocks of the target image comprises:
   providing the sub-feature blocks corresponding to a highest level of the different filtering levels;
   randomly obtaining the incomplete feature blocks from the respective sub-feature blocks corresponding to the highest level, wherein the number of the incomplete feature blocks is greater than or equal to 0, and the incomplete feature blocks are different from each other in the respective corresponding sub-feature blocks; and
   adjusting resolutions of the incomplete feature blocks to be the same as resolutions of the sub-feature blocks corresponding to the highest level.

3. The image recognition method as claimed in claim 1, further comprising:
   adjusting the enhancement learning database based on a recognition result of the target image to form a weighting feature learning database; and
   recognizing the target image based on the weighting feature learning database.

4. The image recognition method as claimed in claim 3, wherein adjusting the enhancement learning database based on the recognition result of the target image to form the weighting feature learning database comprises:
   keeping a corresponding portion of the incomplete feature blocks in the enhancement learning database based on the recognition result;
   removing another portion of the incomplete feature blocks from the enhancement learning database;
   randomly obtaining a plurality of new incomplete feature blocks of the target image; and
   adding the new incomplete feature blocks to the enhancement learning database to form the weighting feature learning database.

5. The image recognition method as claimed in claim 4, wherein the number of the new incomplete feature blocks corresponds to the number of the another portion of the incomplete feature blocks.

6. An image recognition device, adapted to recognize a target image, wherein a portion of the target image is shielded, the image recognition device comprising:
   an image capturing module, adapted to capture the target image;
   a storage module, adapted to store the target image; and
   a processing module, electrically connected to the image capturing module and the storage module, and adapted to provide a plurality of feature blocks of the target image to the storage module to train a learning database, wherein the processing module is adapted to randomly obtain a plurality of incomplete feature blocks of the target image, add the incomplete feature blocks to the learning database to form an enhancement learning database, and thereby recognizes the target image based on the enhancement learning database,
   wherein the processing module comprises a plurality of different filtering levels, the processing module is adapted to obtain the feature blocks from the target image based on the filtering levels, and the feature blocks comprise a plurality of sub-feature blocks corresponding to the different filtering levels.

7. The image recognition device as claimed in claim 6, wherein the incomplete feature blocks are randomly obtained by the processing module from the sub-feature blocks corresponding to a highest level of the different filtering levels.

8. The image recognition device as claimed in claim 6, wherein the processing module is adapted to adjust resolutions of the incomplete feature blocks to be the same as resolutions of the sub-feature blocks corresponding to the highest level.

9. The image recognition device as claimed in claim 6, wherein the processing module is adapted to adjust the enhancement learning database based on a recognition result after recognition of the target image.

10. The image recognition device as claimed in claim 9, wherein the processing module keeps a corresponding portion of the incomplete feature blocks in the enhancement learning database based on the recognition result, removes another portion of the incomplete feature blocks from the enhancement learning database, and randomly obtains a plurality of new incomplete feature blocks of the target image and adds the new incomplete feature blocks to the enhancement learning database to form the weighting feature learning database.

11. The image recognition device as claimed in claim 10, wherein the number of the new incomplete feature blocks corresponds to the number of the another portion of the incomplete feature blocks.

12. The image recognition device as claimed in claim 6, wherein the processing module is adapted to obtain a complete image based on a recognition result after recognition of the target image, and the image recognition device further comprises:
   a display module, adapted to display the target image or the complete image.

\* \* \* \* \*